No. 607,460. Patented July 19, 1898.
F. H. RICHARDS.
WEIGHING MACHINE.
(Application filed July 14, 1897.)

(No Model.) 8 Sheets—Sheet 1.

Witnesses.
R. W. Pittman
G. H. Reed

Inventor
F. H. Richards

No. 607,460. Patented July 19, 1898.
F. H. RICHARDS.
WEIGHING MACHINE.
(Application filed July 14, 1897.)

(No Model.) 8 Sheets—Sheet 2.

Witnesses
R. W. Pittman

Inventor
F. H. Richards

No. 607,460. Patented July 19, 1898.
F. H. RICHARDS.
WEIGHING MACHINE.
(Application filed July 14, 1897.)
(No Model.) 8 Sheets—Sheet 4.

Witnesses
R. W. Pittman
C. H. Head

Inventor
F. H. Richards

No. 607,460. Patented July 19, 1898.
F. H. RICHARDS.
WEIGHING MACHINE.
(Application filed July 14, 1897.)

(No Model.) 8 Sheets—Sheet 5.

Witnesses Inventor

No. 607,460. Patented July 19, 1898.
F. H. RICHARDS.
WEIGHING MACHINE.
(Application filed July 14, 1897.)
(No Model.) 8 Sheets—Sheet 6.
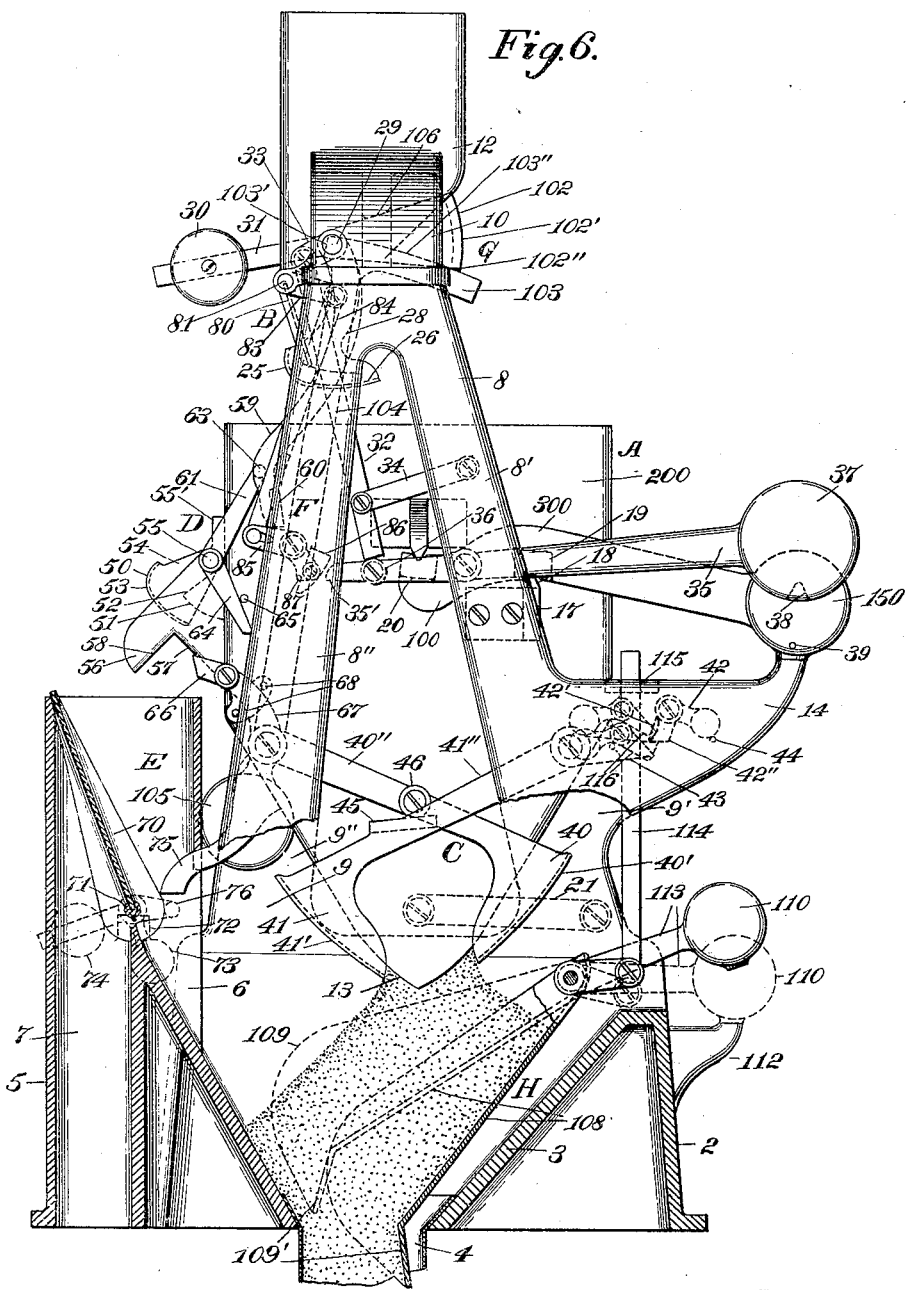
Witnesses:
R. W. Pittman
F. H. Heed
Inventor
F. H. Richards.

No. 607,460. Patented July 19, 1898.
F. H. RICHARDS.
WEIGHING MACHINE.
(Application filed July 14, 1897.)
(No Model.) 8 Sheets—Sheet 7.
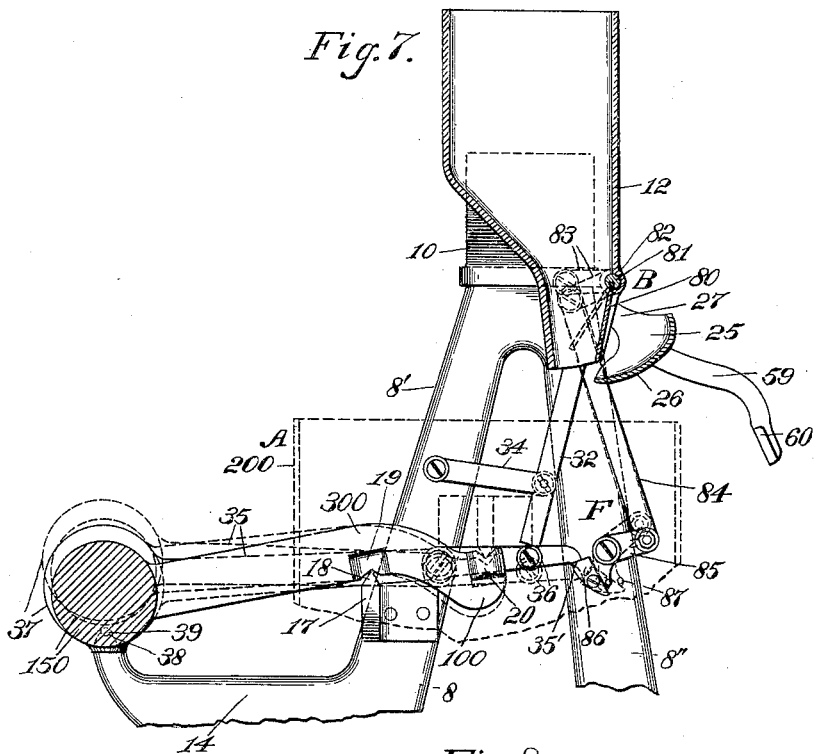
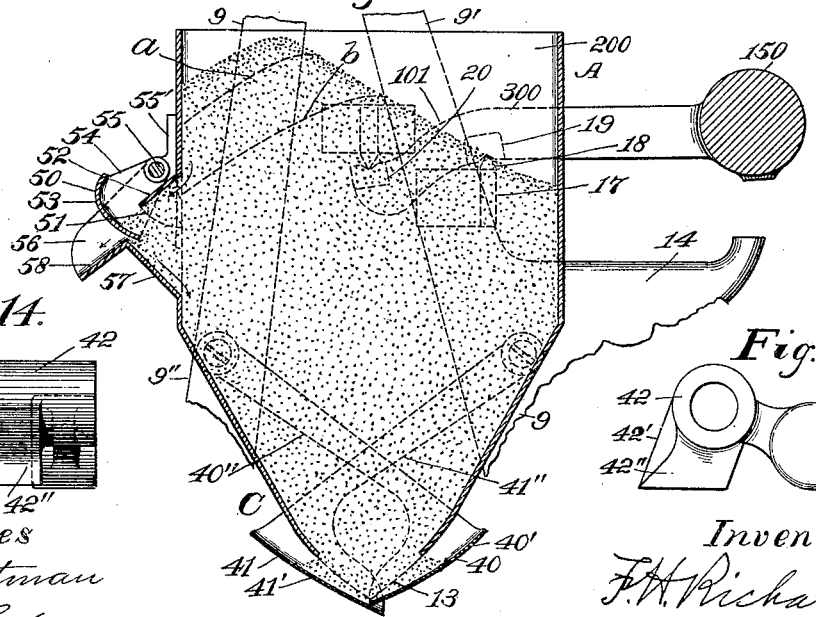
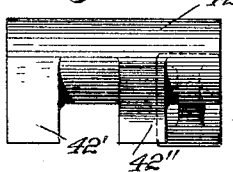
Witnesses
R. W. Pittman
O. H. Reed
Inventor
F. H. Richards No. 607,460. Patented July 19, 1898.
F. H. RICHARDS.
WEIGHING MACHINE.
(Application filed July 14, 1897.)
(No Model.) 8 Sheets—Sheet 8.
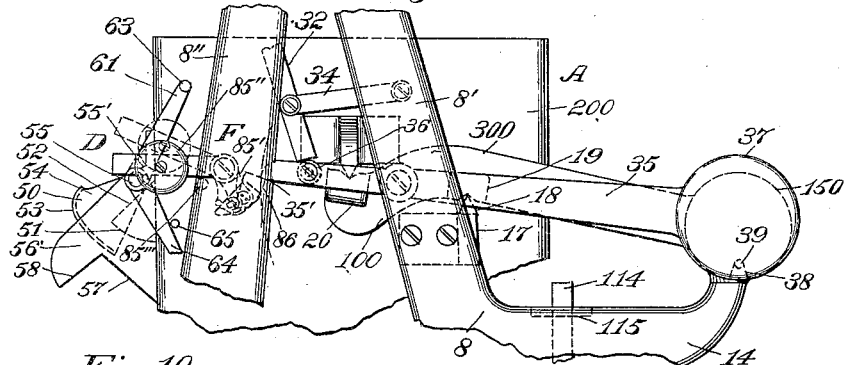
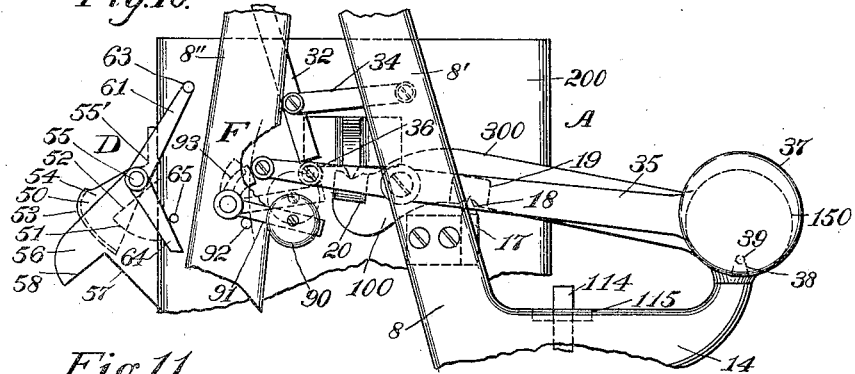
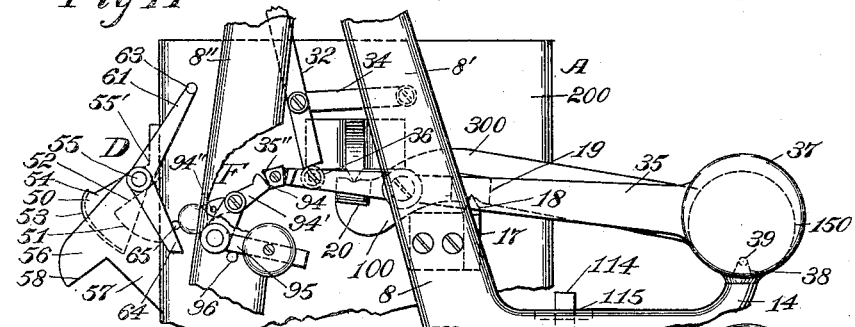
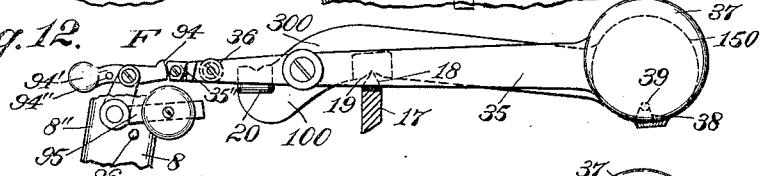
Witnesses
R. W. Pittman
G. H. Reed
Inventor
F. H. Richards

UNITED STATES PATENT OFFICE.

FRANCIS H. RICHARDS, OF HARTFORD, CONNECTICUT.

WEIGHING-MACHINE.

SPECIFICATION forming part of Letters Patent No. 607,460, dated July 19, 1898.

Application filed July 14, 1897. Serial No. 644,583. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines, more particularly to that class designated as "rising-poise" weighing-machines, by means of which an overload is reduced instead of an underload increased, whereby a true and correct load is obtained; and the object of the invention is to provide such an organization of improved mechanisms that this true and correct load will be obtained with rapidity and precision and whereby also shock and jar of the weighing mechanism during its return to its normal position will be prevented.

A further object of the invention is to secure not only the reduction of an overload, thereby to obtain a true load, but also to secure the reduction of such resultant true load, whereby the operation of a part of the machine will be effected.

Figure 1:
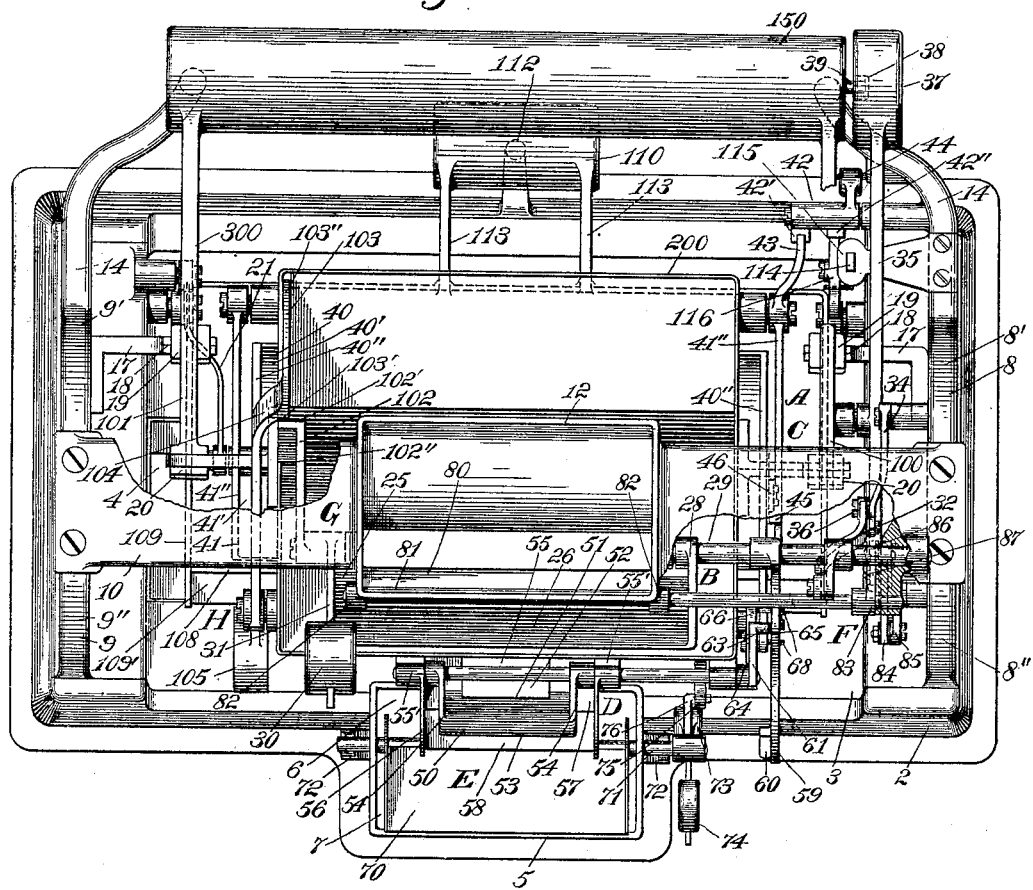
Figure 2:
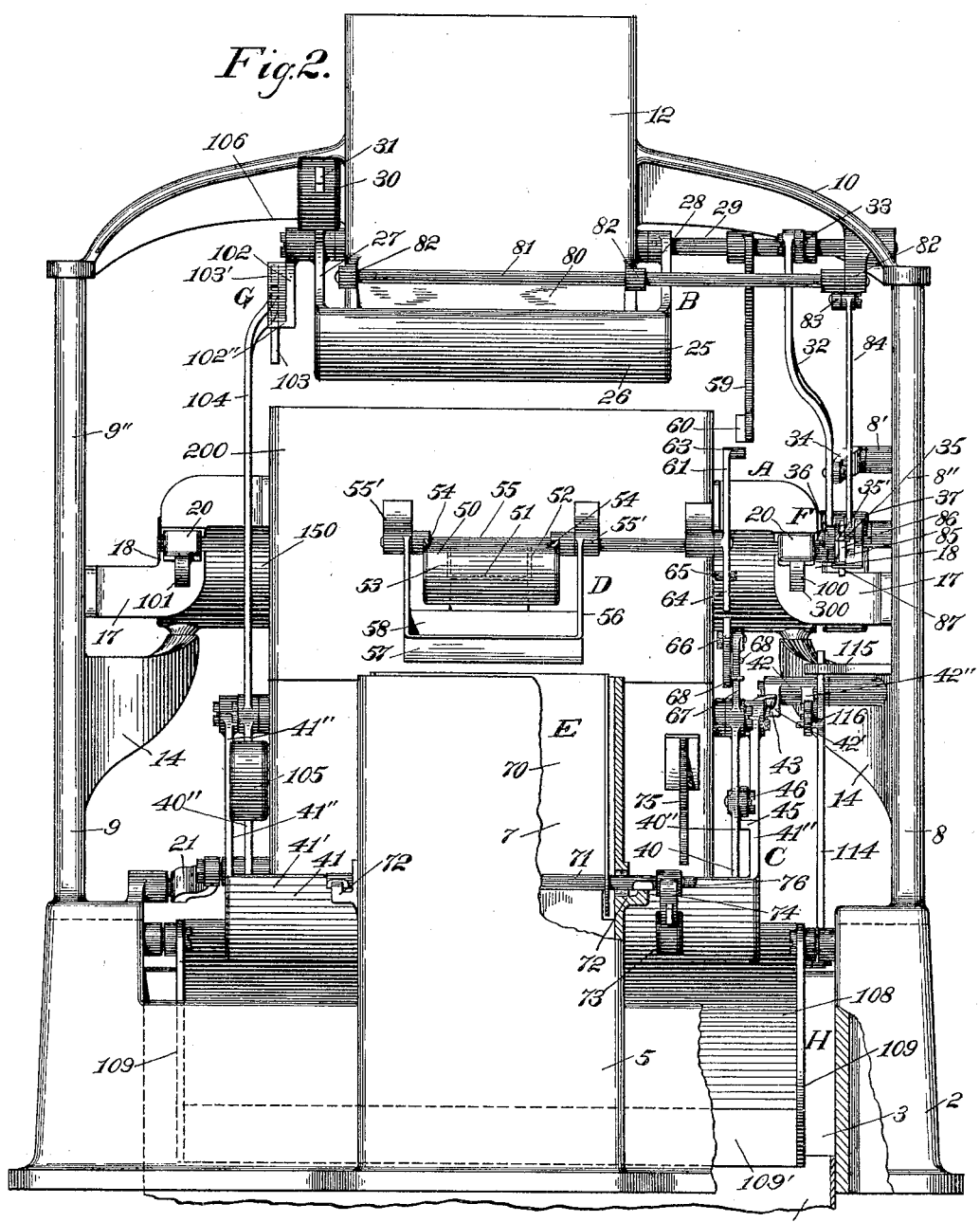
Figure 3:
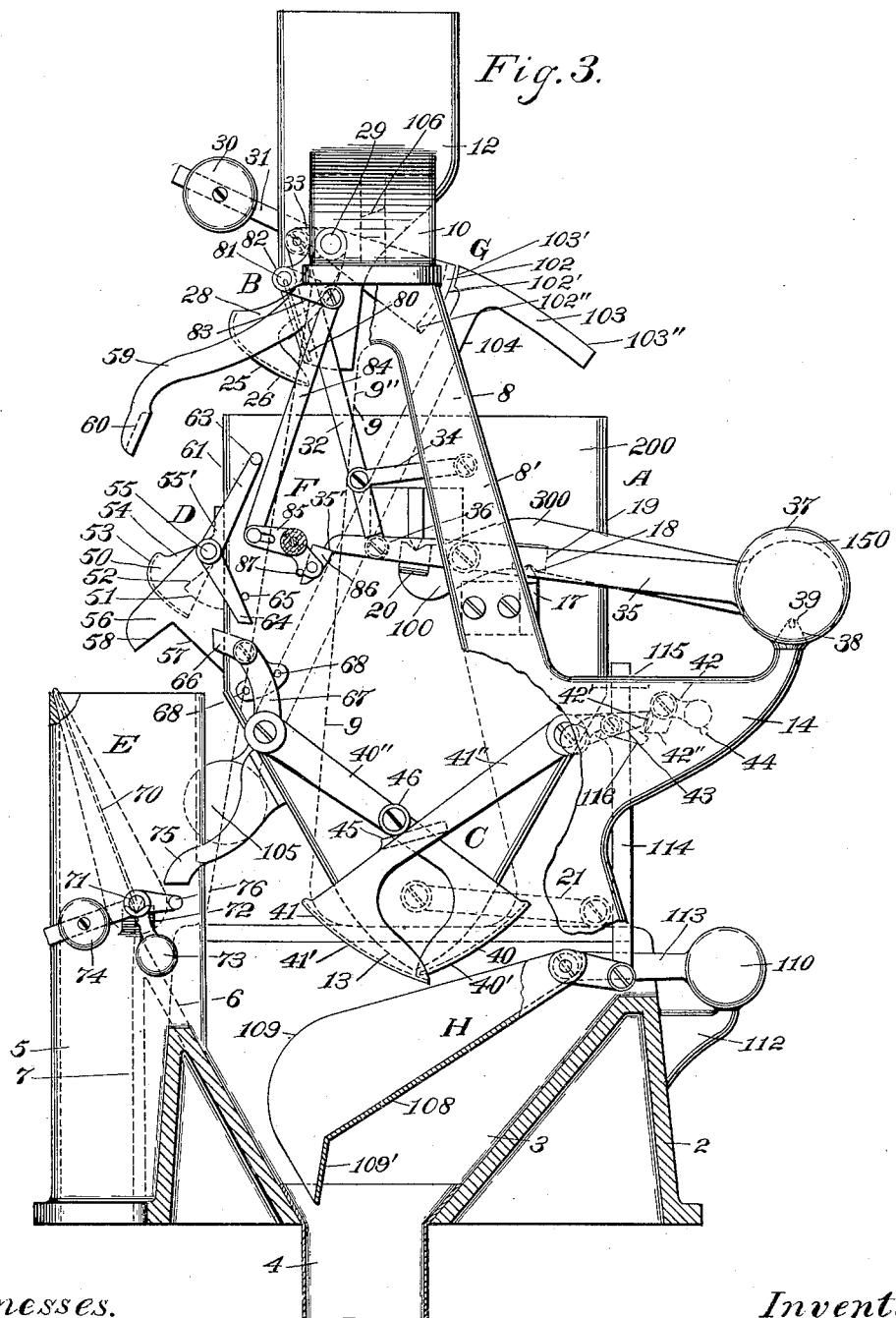
Figure 4:
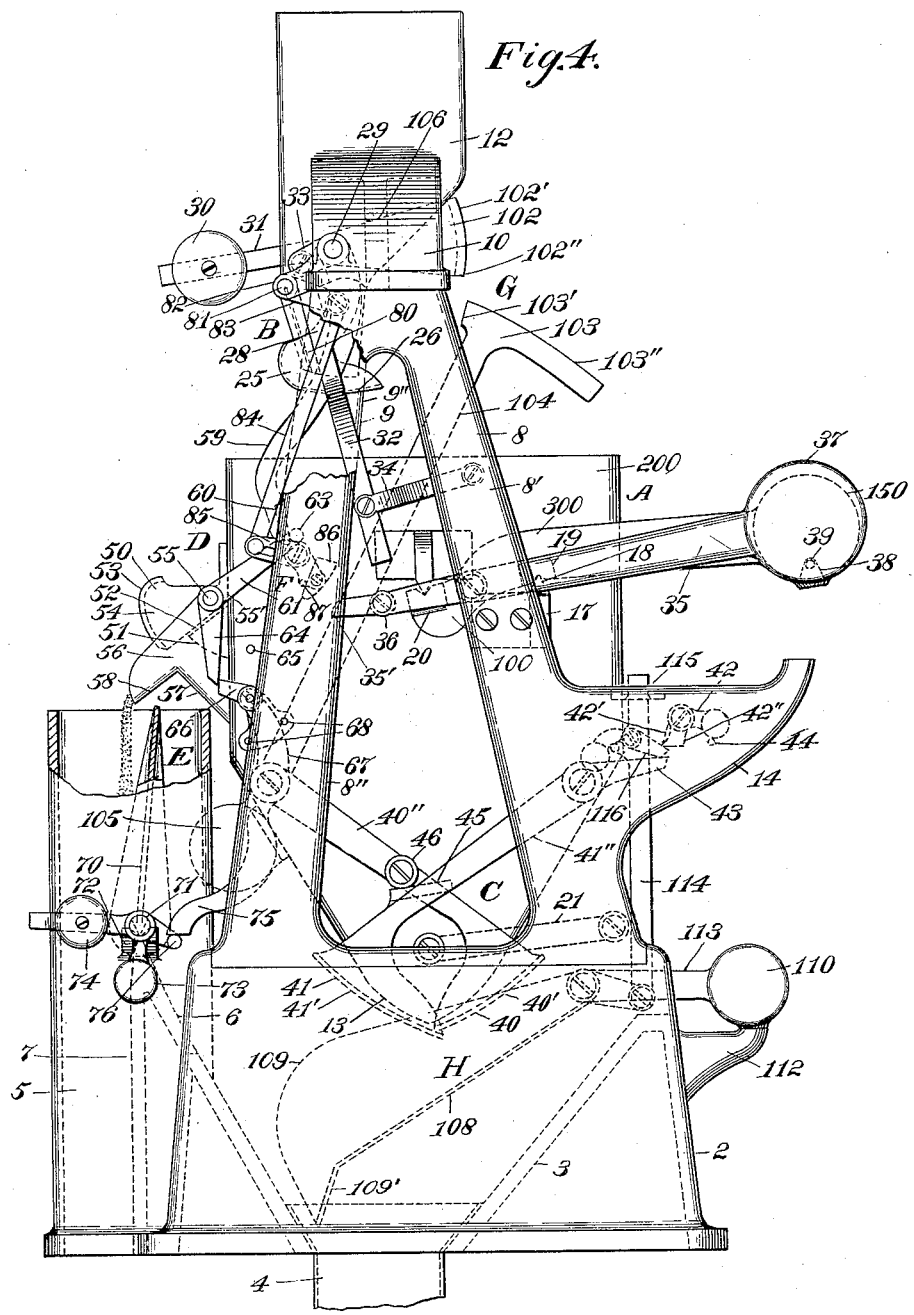
Figure 5:
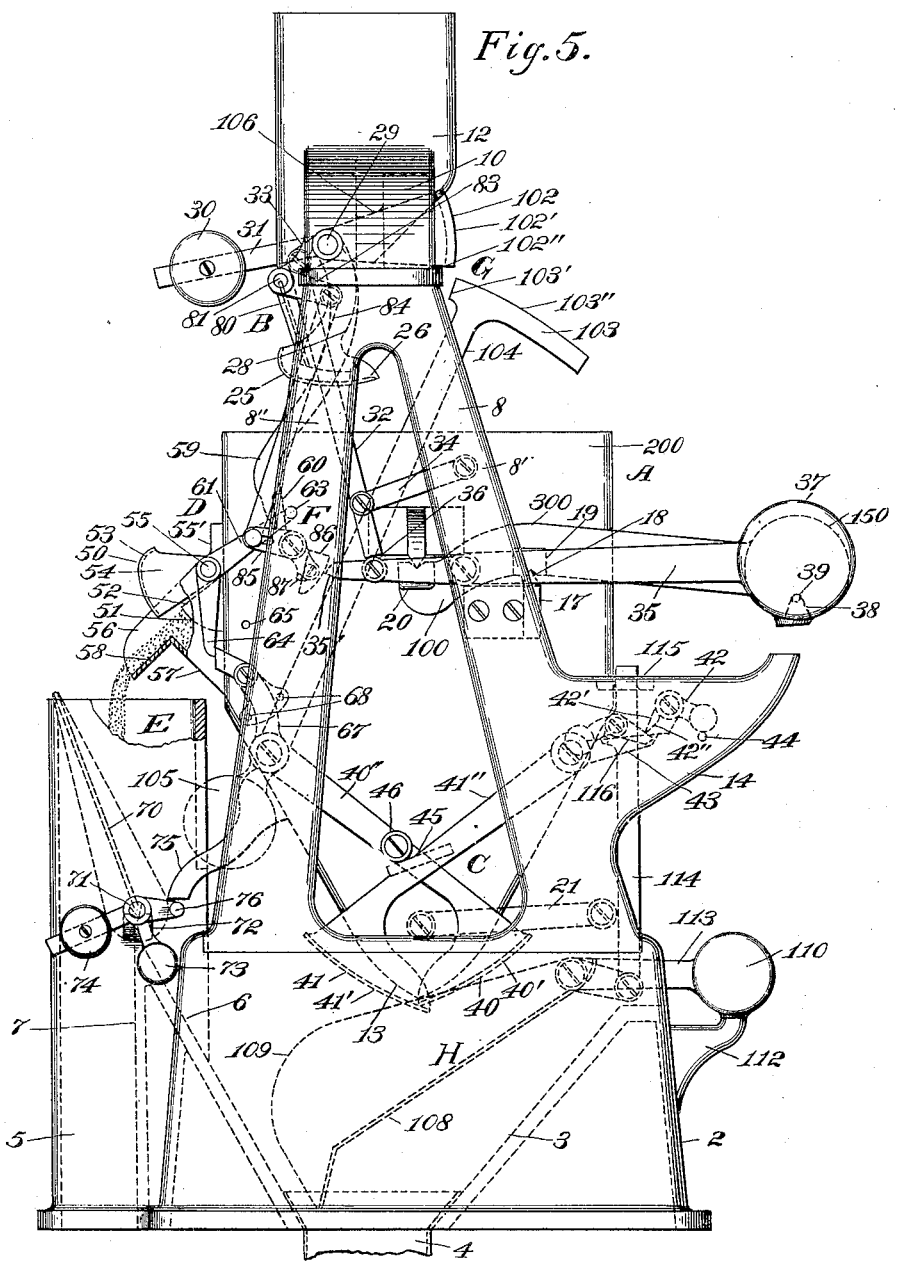

In the drawings accompanying and forming part of this specification, Figure 1 is a top view of one construction of weighing-machine embodying this invention, said figure showing a part of the framework broken away, thereby more clearly to illustrate the operative mechanisms. Fig. 2 is a front view of said machine, likewise having a part of the framework broken away for a similar purpose. Figs. 3, 4, 5, and 6 are side elevations, partly in section, and also having parts thereof broken away, said figures being progressive views of the operative mechanisms. Fig. 7 is a view of the upper portion of said weighing-machine, looking at the side opposite to that illustrated in Figs. 3 to 6, the load-receiver being shown in dotted lines. This view shows one form of mechanism for maintaining the load-receiver against descent until an overload is assured and illustrates in dotted lines the different positions of the weight during this overload period of the receiver. Fig. 8 is a diagrammatic sectional view of the load-receiver for the purpose of illustrating the approximate amount of material necessary to be removed in order to bring the receiver to a poise and the amount thereof necessary to be removed before the operation of the load-discharge or closer mechanism will be effected to discharge the complete load. Figs. 9, 10, 11, 12, and 13 illustrate, respectively, different mechanisms whereby the descent of the load-receiver will be prevented until an overload is assured, and any one of which mechanisms can be substituted in the place of that shown in Figs. 1 to 7, inclusive; and Figs. 14 and 15 are detail views of the actuator means or device operative to unlock the load-discharge or closer mechanism at the proper predetermined period.

Similar characters of reference designate like parts in all the figures of the drawings.

In a general way this weighing apparatus comprehends an improved organization of mechanisms whereby the load-receiver is locked against descent until an overload is positively secured, at which time the stream-controlling means is adapted to control the operation of an overload-reducing means, thereby to permit a true load to be obtained by the reduction of such overload, the operation of the load-reducing means to cut off such reduction being controlled at the proper predetermined period by the load-discharge or closer mechanism, and whereby also in this improved apparatus by a reduction of the true load itself the beam mechanism is operative to actuate the load-discharge or closer mechanism, and thereby permit the same to discharge the completed load.

As a preface to a further description of this improved weighing-machine, it will be understood that the operative mechanisms and their supporting means could be more or less varied without departing from the general scope of the invention.

This improved weighing-machine, in a general way and in the preferred form thereof herein shown and described, comprises weighing mechanism (designated generally by A) comprehending a load-receiver (designated generally by 200) and beam mechanism, (designated generally by 300,) material-supply-regulating or stream-controlling means or mechanism, (designated generally by B,) material-discharge means, such as closer mechanism (designated generally by C) controlled by the beam mechanism to permit the discharge of the load, load-reducing means, (designated generally by D,) shown herein controlled at one predetermined period by the stream-controlling means and at another predetermined period by the material-discharge means and operative to reduce the overload and also a part of the resultant true load, stream directing or deflecting means (designated generally by E) controlled by the weighing mechanism, preferably through the medium of the load-receiver, locking means (designated generally by F) for preventing the descent of the load-receiver until an overload is secured, locking means (designated generally by G) for maintaining the stream-controlling means shut on the opening of the material-discharge means and for preventing the opening of such material-discharge means while such stream-controlling means is open, and regulator means (designated generally by H) adapted to control the operation of a part of the apparatus and shown herein as controlling the shutting of the material-discharge means or closer.

The framework for carrying the operative parts of the machine may be of any suitable construction, but is herein shown comprising a base 2, having a material-discharge hopper or bin 3, terminating in a main discharge conduit or outlet 4, and which base is also provided with a supplemental hopper or chute 5 at one side of the bin 3, and which chute has a passage or conduit 6, communicating with the bin or hopper 3, and a passage or outlet 7, which may, if desired, terminate adjacent to any suitable conveyer means, whereby that part of the material discharged from the receiver during the overload-reducing operation can be reconveyed back to the supply-chute hereinafter set forth. Extending upward from this base 2 is a pair of uprights or side frames 8 and 9, each preferably comprising a pair of members 8' and 8" and 9' and 9", respectively, and which side frames or uprights have secured thereto a top plate 10, adapted to support the material-supply conduit or chute 12, which may be of any suitable or desired construction adapted for the purpose.

The weighing mechanism (designated generally by A) comprises, in the preferred form thereof herein shown and described, a load-receiver, which may be of any suitable construction, but is shown herein comprising a receptacle or bucket, (designated generally by 200,) preferably of the single-chambered type or class, having preferably adjacent to its lower end a main load-discharging mouth 13 and also having at one side thereof an outlet or opening, hereinafter described, to permit the reduction of the load. This load-receiver is carried by beam mechanism (designated generally by 300) comprehending a beam or counterbalancing-weight 150, adapted in its normal position to rest on a pair of supporting arms or brackets 14, extending rearwardly from the side frames 8 and 9, and which weight has connected therewith a pair of scale beams or arms 100 and 101, adapted to support the load-receiver, and for this purpose each of said beams is supported on the framework by means of suitable bearings 17, shown herein as knife-edge pivots 18 and V-shaped bearing members 19, the pivots preferably being carried by the side frames 8 and 9. In the construction shown similar bearings 20 are used between the beam mechanism and load-receiver. To maintain the load-receiver in proper position during its operation and prevent lateral or oscillatory movement thereof, the receiver is shown connected to the framework by a suitable connector 21, pivotally secured to said framework and load-receiver.

The stream-controlling means, (designated generally by B,) in the preferred form thereof herein shown and described, comprehends a valve 25, comprising a concaved valve-plate 26, having a pair of valve-arms 27 and 28, one at each end thereof. One of the valve-arms, as 27, is pivotally secured to one side of the supply-chute, while the other, as 28, is rigidly secured to a short rock-shaft 29, journaled in one of the supply-chute walls and in the top plate 10, whereby the valve is in position at the mouth of said chute to control the supply of material to said load-receiver. This valve is provided with an adjustable weight 30, adapted to swing the same into position to cut off the stream of material, and which weight is shown carried by an arm 31, rigidly secured to the hub of one of the valve-arms, as 27. Suitable means is provided for opening and locking the valve open during the load-receiving period of the machine, and which is herein designated for the purposes of this specification as a "valve-actuator locker," and is shown herein in the nature of a depending member, such as a lever 32, pivotally secured to an arm 33, rigidly secured to the valve rock-shaft 29. This depending member is connected to one of the side frames, such as the member 8' thereof, by means of a suitable connector or link 34, whereby it is held in proper position to engage a part of the beam mechanism, which preferably comprises a supplemental beam-arm 35, pivotally connected to one of the scale beams or arms, as 100. This supplemental beam-arm is provided adjacent to one end with a projection or roll 36, adapted to engage the lower end of said depending member 32, and at its opposite end with a weight 37. This weight in view of its position constitutes a part of the beam-weight and is provided with a recess 38, into which a projection 39, carried by the beam-weight proper, 150, extends, whereby said supplemental weight will be carried upward with the beam-weight on the descent of the receiver. When the beam-weight 150 and the supplemental weight 37 are in their normal positions, it will be seen that the depending member 32 will be maintained in position to lock the valve open; but that on the descent of the receiver and the consequent ascent of the beam and supplemental weights therewith said depending arm, owing to the action of the valve and its weight 30, will move downward simultaneously with the descent of the roll, whereby the valve will close.

The material-discharge means, (designated generally by C,) in the preferred form thereof herein shown and described, comprises a pair of closers 40 and 41, each comprehending a closer blade or plate 40' and 41', respectively, and a pair of arms 40" and 41"', respectively, each pair of arms 40" and 41" being pivotally secured to the load-receiver, one at each side thereof. In this construction of closer mechanism the closers are not self-opening by the weight of the load, as has generally been the case heretofore, and consequently no locking means is provided or is necessary for preventing the opening of said closers. The closer-arms are shown herein as relatively long arms, one pair, as 40", crossing the other pair, as 41", and are so pivoted that the weight of the material on the closer blades or plates 40' and 41' will be approximately in a direct line with the pivotal points of the closer-arms, whereby such material will have no tendency to open said closers. In the present instance each closer blade or plate is shown slightly eccentric to its pivotal point. Suitable means is provided for opening the closers at the proper predetermined time, and in the structure shown it comprises an actuator such as a weighted member or by-pass 42, pivotally secured to one of the beam-weight, supporting brackets 14 and provided with a stop or projection 42' in position to engage a supplemental closer-arm 43, rigidly secured to the hub of one of the closer-arms 41". A suitable stop 44 is disposed in position to limit the movement of this by-pass. The closer 41 has one of its arms 41" provided with a laterally-extending and inclined member 45 in engagement with a projection or friction-roll 46, carried by one of the arms 40" of the closer 40, whereby on the opening of the closer 41 the upward movement thereof will, by means of the inclined member 45, operate to open the closer 40. From the above it will be seen that on the descent of the load-receiver with an overload of material the arm 43 passes the actuator or by-pass projection 42', which, by means of its weight, is immediately shifted into position to engage at the proper time said arm 43. On the ascent of the load-receiver to its poising position this actuator projection 42' engages said arm 43, whereby when the beam mechanism overbalances the weight of the material in the load-receiver, which is effected by the reduction of the true load in the manner hereinafter set forth, the return of said beam mechanism to its normal position and the continued ascent of said load-receiver above its poising position operate to unlock the closers, thereby to permit the discharge of the load.

From the foregoing it will be seen that the weight of the load has no tendency to open the closers, but that such closers are opened by the beam mechanism through the medium of the load-receiver on the ascent thereof above its position of poise, due to a reduction of a part of the true load in the manner hereinafter set forth.

The load-reducing means (designated generally by D) for reducing in this improved weighing apparatus not only the overload, but also a part of the true load, may comprehend any desired and suitable instrumentality operative to permit or positively to secure such reduction; but in the preferred form thereof herein shown and described this load-reducing instrumentality comprises some suitable stream controller or controlling means, such as a valve 50, preferably carried by the load-receiver adjacent to an outlet or opening 51, herein shown at one side of said receiver. At the upper portion of this outlet or opening the receiver outer wall is provided with a hood or guard 52, forming one character of spout. The load-reducing valve preferably comprises a concaved valve blade or plate 53, operative below the mouth of the hood, and a pair of relatively wide sides or arms 54, overlapping the sides of said hood, and which arms are rigidly secured to a rock-shaft 55, journaled in bearings 55', carried by the load-receiver above said hood. This hood or spout 52 opens into a second spout 56, the bottom of which comprises a pair of oppositely-inclined walls 57 and 58, the inner inclined wall 57 thereof being adapted to direct a part of the stream back into the bucket on the closing of the reducing-valve, while the outer inclined wall 58 constitutes the surplus-spout proper and directs the same into the supplemental chute 5. Owing to this hood and construction of spout it will be seen that it is only necessary in order completely to cut off the outflow of material to have the valve-blade extend under the extreme outer part of the hood-mouth and over the apex or juncture points of the inclined walls 57 and 58. As one means for opening this load-reducing instrumentality at the proper predetermined period, and which opening movement in this structure of apparatus is obtained by means of the main or supply stream controller 25, suitable reducing-valve-actuating means is shown. This actuating means preferably comprises a depending member or arm 59, rigidly secured to the valve rock-shaft 29 and provided at its lower end with an upwardly-inclined lateral projection 60. Rigidly secured adjacent to the outer end of the reducing-valve rock-shaft 55 is a coacting member comprising a duplex arm 61, one part or arm of which, as 62, is provided with a laterally-extending projection 63, adapted to be engaged by the projection 60 of the arm 59 on the closing of the stream-controller, whereby the reducing-valve will be opened. Owing to the inclination of the projection 60 a slight play is permitted between said projections 60 and 63 on the ascent of the load-receiver, whereby the proper poising of the weighing mechanism will not be interfered with. The other part of this duplex arm 61 comprises a depending member 64, normally in engagement with a stop 65, carried by the receptacle, whereby the closing movement of the reducing-valve is limited. On the opening of said reducing-valve this member 64 is carried into position to be engaged by a suitable locker 66, whereby the valve will be locked open during the proper predetermined period to permit the reduction of the load. This locker 66 is shown herein connected with the closer mechanism, and in the preferred form thereof it comprises a weighted member pivotally secured to an arm 67, rigidly connected with one of the hubs of one of the closer-arms 40″. The locker is held in shiftable position by suitable stops 68, carried by the weighted part thereof at each side of the arm 67, whereby movement of said locker is permitted on the opening of the valve to allow the passage of the arm 64. From the foregoing it will be seen that when the reducing-valve is open the member 64 thereof will be in position to be engaged by the locker 66 and held open till the opening of the closers, which will then disengage the locker 66 from said arm 64 and thereby permit the closing of the reducing-valve, such closing movement taking place on the ascent of the receptacle, which in practice occurs substantially simultaneously with the opening of the closer mechanism, whereby the projection 63 will be carried upward and into position to pass over the top of the projection 60.

From the above it will be seen that the main or supply stream controller operates to control the load-reducing instrumentality at one period—namely, to open the same—while the load-discharging means or closer operates at another period also to control said load-reducing instrumentality—namely, to lock the same open and unlock the same and thereby permit it to close.

In this improved apparatus suitable stream directing or deflecting means (designated generally by E) is provided by means of which on the discharge from the receiver of that part of the material forming the overload it will be so directed that it can be reconveyed to the supply-chute, if desired, and on the discharge of a part of the true load such material will be so directed that it will rejoin and again form a part of the true load when the major portion thereof is discharged by the closer mechanism. In this apparatus it will therefore be seen that not only can the overload be discharged, thereby to bring the weighing mechanism to a poise, but a portion of the true load itself can also be discharged without permanent loss thereof, as such discharged material rejoins and again forms a part of the load before the same is conveyed or while being conveyed from the apparatus, and by the reduction of this true load the opening of the closer mechanism can be effected by the beam mechanism when the same overbalances the material remaining in the receptacle. In the preferred form herein shown and described this deflecting means comprises a blade or plate 70, disposed in the supplemental chute 5 and rigidly secured to a rock-shaft 71, which is supported by suitable bearings 72, preferably outside of said chute 5. These bearings are herein shown as knife-edge pivots and V-shaped bearing members. This shaft 71 is shown carrying a pair of weights 73 and 74. One of these weights, as 73, constitutes a counterbalancing-weight for the blade, while the other weight, as 74, which is preferably adjustable for the purpose hereinafter set forth, constitutes the means for returning the deflector into its position after the shifting thereof by the weighing mechanism, and also constitutes in the structure shown a part of the receiver-counterbalancing means in that it assists the ascent of the loaded receiver to its poise position in the manner hereinafter set forth. This deflector-blade 70 constitutes at one period a closer for the chute outlet-passage 7 and at another period a closer for the passage 6, communicating with the hopper, and for this purpose it is shown herein operative by the weighing mechanism, preferably through the medium of the load-receiver. For this purpose the load-receiver is shown provided with a projection or arm 75 in position to engage an arm 76, rigidly secured to the deflector rock-shaft 71, whereby on the descent of the load-receiver, the deflector being in the position shown in Fig. 3, said receiver-arm 75 will engage the deflector-arm 76 and shift the blade into position to close the communicating passage 6 and permit the material on the opening of the reducing-valve to flow through the chute outlet-passage 7, such flow of material continuing until the receiver commences to ascend to its poising position, whereby the upward movement of its arm 75 allows the return or upward movement of the deflector-arm 76, owing to the action of the weight 74, and thereby permits said weight 74 to shift the deflector quickly into position to close the outlet-passage 7, whereby the material is then directed through the passage 6 into the hopper 3, where it rejoins and again forms a part of the weight-load. It will be observed that owing to the particular disposition of this deflector a very slight movement of the receptacle is sufficient to shift said deflector into position, thereby to deflect the stream into one or the other passage, as the case may be. It will also be observed that as the bucket moves upward to its position of poise the weight 74 in returning to its normal position assists the ascent of such bucket, owing to the engagement of the arms 75 and 76, and hence said weight 74 constitutes a part of the receiver-counterbalancing means, as above set forth, the beam-weight 150 in this structure being made of somewhat less gravity than the true load, whereby on the adjustment of the weight 74 the proper equalization of such true load can be obtained.

In order that an overload may be absolutely assured before the descent of the load-receiver, suitable locking means (designated generally by F) operative to maintain said receiver in its load-receiving position is provided, and in one form thereof herein shown and described it comprises a shiftable member, such as a blade or plate 80, carried by a rock-shaft 81, journaled in bearings 82, mounted on the supply-chute, and which blade in this structure constitutes one, as the outer, wall of the supply-chute passage or mouth, whereby it is in permanent engagement with the material. The outer end of the shaft 81 is shown journaled in a bracket 82, supported by the top plate 10, and is provided with an arm 83, rigidly secured thereto. Pivotally secured to this arm is a connector 84, the opposite end of which is adjustably secured to a shiftable member or locker 85, pivotally secured to one of the members, as 8'', of one of the side frames, as 8. This shiftable member 85 carries a stop or by-pass 86, pivotally secured thereto and maintained in position by a suitable stop 87, carried by the locker 85. This locker is in position to have its by-pass engage the under side of the projecting end 35' of the supplemental beam-arm 35, whereby the ascent of the beam-weight, and the consequent descent of the load-receiver, is positively prevented until there is sufficient material in said receiver not only to overbalance said beam-weight, but also to overcome the pressure of the material against the plate 80, forming one of the walls of the supply-chute. When, however, the proper overload has been secured, the ascent of the beam-weight forces down the inner end of the supplemental beam-arm 35, thereby shifting the locker 85, and consequently the blade 80, against the pressure of the material passing from the supply-chute into position to permit the passage of said supplemental beam-arm, and thereby the complete descent of the load-receiver.

On the return of the beam-weight to its normal position the end 35' of the beam-arm 35 passes the by-pass or stop 86, which is shiftable for this purpose, the pressure of the supply-stream having returned the blade, and thereby the locker 85, into its normal position after the disengagement of said locker and beam-arm 35. From the foregoing it will be seen that by this locking means the weighing mechanism, comprehending the beam mechanism and load-receiver, is prevented from shifting until an overload is assured and that the passage of the supply material or stream to the load-receiver controls the descent of said receiver, thereby holding it in position positively to receive an overload before its descent. Furthermore, it will also be seen that the shiftable blade 80, while forming a part of the supply-chute, also constitutes a means for assisting in temporarily reducing the supply-stream, and thereby assists the cut-off valve and permits the easy and quick action of the same.

In the forms of receiver-locking means shown in Figs. 9 to 13, inclusive, they are constructed to operate independently of the supply material or stream to maintain the load-receiver in its overload-receiving position. In the form thereof shown in Fig. 9 the locker 85' is substantially similar to that shown in Figs. 1 to 7, inclusive, but carries an adjustable weight 85'', the weight-supporting arm thereof being maintained in its normal position by a stop 85'''. In this structure of receiver-locking means it will be seen that the bucket is prevented from descending and the beam-weight from ascending until an overload is secured sufficient not only to overbalance the beam-weight 150, but also to overbalance the weight 85'' of the locker 85', whereby the inner end 35' of the beam-arm 35 will force its way by said locker, and thereby permit the descent of the receptacle. The return of the locker into its normal position is effected by its weight 85''.

In that form of weighing-mechanism-locking means shown in Fig. 10 the weight 90 is carried by an arm 91, extending in an opposite direction to that shown in Fig. 9, and is maintained in its normal position by a projection 92, while the beam-arm stop 93, rigidly secured to the hub of said arm 91, is shown as a cam-faced member.

In the form of locking means shown in Figs. 11 to 13 the beam-arm 35 is provided with a cam-faced pivotal member 35'' in position to engage a cam-faced end 94 of a weighted by-pass or shiftable stop 94', having a projection 94'' for limiting its movement. This stop 94' is pivotally carried by a weighted shiftable member or locker 95, which in turn is pivotally secured to one of the members of one of the side frames and maintained in its normal position by a suitable stop 96. From the above it will be seen that the cam-faced member 35'' of the beam-arm and the locker-stop 94' form to a certain extent a toggle connection whereby the load-receiver is locked against descent until an overload is secured sufficient to overcome the weighted locker 95, whereby the cam-faced end 94 of the by-pass 94', having been pressed downward, thereby simultaneously raising the weighted part of the locker 95, the shifting of the cam-faced member 35'' of the beam-arm 35 permits said beam-arm to pass free and thereby permit the descent of the load-receiver, the by-pass 94' returning to its normal position owing to its weight. On the return of the beam-arm the locker 95 is shifted upward to permit the passage of said beam-arm thereby.

From the foregoing it will be seen that by the use of any of the locking means above described the beam-weight will be limited in its upward movement, and consequently the load-receiver limited in its descending movement, until an overload is assured.

In order to maintain the closers shut against the accidental opening thereof or tampering therewith and also to lock the main or supply valve shut when the closers are open, suitable locking means (designated generally by G) is provided for this purpose, and which valve-closer-locking means, in the preferred form shown, comprises a shiftable member in the nature of a stop 102, rigidly secured to the hub of one of the valve-arms, as 27, and provided with a laterally-extending flange. The other member of this locking means comprises a coacting stop 103, having a relatively long arm 104, fixedly secured to the hub of one of the closer-arms, as 40'', preferably that one which does not carry the reducing-valve locker 66, a counterbalancing-weight 105 for said locker being also secured to said closer-arm hub. By means of this locking means it will be seen that when the closers are shut and the valve is open the stop-face 103' of the closer-locker is in position to engage the convex face 102' of the valve-locker, which latter is free to move upward in the arc of a circle on the closing of the valve, the upward movement thereof being limited by a stop 106, preferably formed on the top plate. When, however, the valve closes, which occurs before the opening of the closers, the valve-stop 102 is moved upward, whereby on the opening of the closers the curved face 103'' of the closer-stop is shifted into position under the flange-face 102'' of the valve-stop, thereby locking the valve shut while the closers are open.

In this construction of weighing apparatus suitable regulator mechanism (designated generally by H) is provided, operative to control one part of the machine, and in the preferred form thereof herein shown and described this regulator mechanism comprises a regulator plate or blade 108, preferably provided with relatively wide sides 109 and a depending flange 109'. This regulator is shiftably secured within the hopper or bin 3 and in position beneath the load-discharge mouth 13 of the receiver, whereby on the discharge of the load the regulator is shifted to permit the outflow thereof through the conduit 4. A suitable counterbalancing-weight 110, adapted to rest, when in its normal position, on a bracket 112, projecting from the base, is rigidly secured by a pair of arms 113 to the regulator-blade, whereby the regulator will be returned to its normal position after the material has passed the same. In the structure shown this regulator controls the unlocking of the closers from their locked-open position, thereby to permit the same to shut, and for this purpose said regulator is provided with an upwardly-extending actuator 114, the upper end thereof being guided by a suitable guide device 115, projecting from the framework. Pivotally secured to this actuator 114 is a locker-tripper 116, shown as a weighted by-pass adapted to engage a projection 42'', carried by the closer-actuator 42, from which it will be seen that when the regulator is shifted by the weight of the discharging material the actuator will be moved upward, thereby carrying the tripper 116 past said closer-actuator 42 and into position to engage the same, so that on the return of the regulator to its normal position, and the consequent descent of its actuator 114, the closer-actuator 42 will be shifted by the tripper 116 to release the supplemental arm 43 of the closer, whereupon the closers will immediately swing shut by their own weight.

The operation of this improved weighing apparatus is substantially as follows: The operative mechanisms being in the positions shown in Fig. 3, it will be observed that the beam mechanism is retarded in its movement, thereby limiting the downward movement of the receiver until an overload is assured, at which time the weight of such overload unlocks the beam mechanism, whereupon the load-receiver descends. On the downward movement of the supplemental beam-arm 35 simultaneously with the descent of the receiver the supply-valve 25 is unlocked from its open position and permitted to close, thereby unlocking the closers, owing to the disengagement of the stops 102 and 103. On the closing of said supply-valve the load-reducing valve 50 is opened and locked open by the closer mechanism, Fig. 4, to permit the reduction of the load in the receptacle, and which outflowing material passes through the passage 7 of the supplemental chute 5 and away from the bin 3, owing to the shifting of the deflector 70 to close the passage 6 on the descent of the load-receiver. When the overload has been reduced—for instance, to the extent shown by dotted line $a$, Fig. 8—the load-receiver ascends to its poising position, Fig. 5, thereby disengaging the deflector 70 and permitting the same to be shifted by means of its weight into position to close the passage 7 of the supplemental chute 5 and open the communicating passage 6 thereof, whereby, as the reducing-valve is still open, a part of the true load is discharged and flows through said passage 6 into the bin or hopper 3, where it rejoins and again forms a part of the load when the discharge thereof takes place. When a predetermined proportion of this true load has passed from the receiver—for instance, such an amount as indicated between the dotted lines $a$ and $b$, Fig. 8—the beam-weight 150 is then sufficient to overbalance the partially-loaded receiver, and consequently returns to its normal position, whereupon said receiver is carried upward to its normal position, and consequently above its position of poise, whereby the closer-actuator 42, by its engagement with the closer supplemental arm 43, opens the closers in the manner hereinbefore set forth and the final discharge of the load takes place. On the opening of the closers the supply-valve is locked shut. As the closers commence to open the reducing-valve is unlocked and closes, thereby cutting off the flow of material at this point. The discharging load operates the regulator 108 in the manner above set forth to carry the tripper 116 thereof into position to trip the closer-actuator 42, and thereby unlock the closers and permit the same to shut at the proper predetermined period, which occurs in practice substantially after all appreciable amount of material has passed the regulator, at which time the return of said regulator into its normal position operates to disengage the closer supplemental arm 43 from the actuator 42. On the return of the beam mechanism to its normal position, which takes place after the reduction of the true load, the supply-valve 25 being locked shut by means of the closer mechanism, the supplemental beam-weight 37 is held suspended until said valve is unlocked by the shutting of the closers, whereupon the closer-stop 103 disengages the valve-stop 102 and the supplemental weight is free to descend and open the valve by means of the beam-arm 35 and depending member 32, so that another load will be received by the load-receptacle.

In conclusion, it will be seen that the overload is reduced to secure a true load and that a part of such resultant true load is temporarily reduced thereby to permit the opening of the closer mechanism by means of the beam mechanism through the medium of the load-receiver on the ascent thereof, and it will also be seen that in this improved apparatus the load-receiver has a load-receiving position, an overload position, a true-load position, and a main-load-discharging position, the latter being the same as its load-receiving position. In other words, the discharge of the load takes place when the receiver has practically returned to its normal or load-receiving position.

Having thus described my invention, I claim—

1. The combination of weighing mechanism embodying a load-receiver; load-supply means therefor; a load-reducing instrumentality operative to effect the reduction of the load before the final discharge thereof; and load-discharging means supported independently of, and adapted to control the closing of said load-reducing instrumentality at one predetermined period.

2. In a rising-poise weighing-machine, the combination of weighing mechanism embodying a load-receiver; overload-supply means therefor; a load-reducing valve operative to effect the reduction of the load before the final discharge thereof; and load-discharging means supported independently of, and operative to control the closing of said load-reducing valve at one predetermined period.

3. In a rising-poise weighing-machine, the combination of weighing mechanism embodying a load-receiver; overload-supply means therefor; a load-reducing valve operative to effect the reduction of the load before the final discharge thereof; and load-discharging means supported independently of, and adapted to lock open said load-reducing valve to permit the reduction of the load.

4. In a rising-poise weighing-machine, the combination of weighing mechanism embodying a load-receiver; overload-supply means therefor; a load-reducing valve operative to effect the reduction of the load before the final discharge thereof; and load-discharging means supported independently of, and adapted to lock open said load-reducing valve to permit the reduction of the load, and operative also to unlock said reducing-valve from its open-lock position and thereby permit the same to close.

5. In a rising-poise weighing-machine, the combination of weighing mechanism embodying a load-receiver; overload-supply means therefor; an oscillatory load-reducing valve operative to effect the reduction of the load before the final discharge thereof; and load-discharging means supported independently of, and adapted when in its normal position to lock said load-reducing valve open, thereby to permit the reduction of the load, and adapted, on its operation to dischage the load, to unlock said load-reducing valve from its open-lock position, and thereby permit the same to close.

6. In a rising-poise weighing-machine, the combination of a load-receiver; load-supply means therefor; a load-reducing instrumentality operative to effect the reduction of a load before the final discharge thereof; load-discharging means adapted to control the operation of said load-reducing instrumentality at one predetermined period; and means, operative independently of the weight of the material in the receiver, for actuating said load-discharging means on the ascent of said load-receiver, thereby to effect the discharge of the load.

7. The combination of weighing mechanism embodying a load-receiver; load-supply means therefor; stream-controlling means for regulating the supply of material to said receiver; load-discharging means; and a load-reducing instrumentality operative to effect the reduction of the load before the final discharge thereof, and controlled in its operation at one predetermined period by the stream-controlling means, and at another predetermined period by the load-discharging means.

8. In a rising-poise weighing-machine, the combination of a load-receiver; overload-supply means for said receiver; stream-controlling means for regulating the supply of material to said receiver; load-discharging means; and a load-reducing valve opened at one predetermined period by the stream-controlling means, and locked open and unlocked from its open position at another predetermined period by the load-discharging means.

9. The combination of a load-receiver provided with a shiftable closer operative to discharge a load; overload-supply means for said receiver; valve mechanism for regulating the supply of material to said receiver; a load-reducing valve operative to effect the reduction of the overload; means operative by said valve mechanism to open said load-reducing valve; and means controlled by the closer and operative to lock said load-reducing valve open and then to unlock the same from its open-lock position, and thereby permit it to close.

10. The combination of a load-receiver having a shiftable closer operative to discharge a load; overload-supply means for said receiver; a load-reducing valve; a valve operative to regulate the supply of material to said receiver; means operative by said valve and coacting with the load-reducing valve to open the same on the shutting of the supply-valve; and means connected with the closer and operative to lock said load-reducing valve open when the closer is shut and to unlock said load-reducing valve from its open-lock position, and thereby permit the same to shut on the opening of said closer.

11. In a rising-poise weighing-machine, the combination of a load-receiver; load-supply means therefor; stream-controlling means for regulating the supply of material to said receiver; load-discharging means; means for actuating said load-discharging means on the ascent of said receiver thereby to effect the discharge of the load; and a load-reducing instrumentality operative to effect the reduction of the load before the final discharge thereof, and controlled in its operation at one predetermined period by the stream-controlling means, and at another predetermined period by the load-discharging means.

12. The combination of a load-receiver; load-supply means therefor; a load-reducing instrumentality carried by said receiver and having an arm; stream-controlling means operative to regulate the supply of material to said receiver; a depending arm having one end directly connected to said stream-controlling means and its opposite end swinging free and adapted to coact with the load-reducing-instrumentality arm, whereby on the shutting of the stream-controlling means, the load-reducing instrumentality is actuated, thereby to effect the reduction of the load.

13. The combination of a load-receiver; overload-supply means therefor; a load-reducing valve carried by said receiver and having an arm; stream-controlling means operative to regulate the supply of material to said receiver, and also having an arm extending into position to coact with the reducing-valve arm, whereby, on the shutting of the stream-controlling means, the reducing-valve is opened; load-discharging means; and means operatively connected with said load-discharging means and adapted to control the closing of said reducing-valve.

14. The combination of a load-receiver having a shiftable closer operative to discharge a load; load-supply means for said receiver; a load-reducing valve having a pair of arms; a valve operative to regulate the supply of material to said receiver and also having an arm coacting with one of the load-reducing-valve arms, whereby, on the shutting of said supply-valve, the load-reducing valve is opened; and means connected with the closer and operative to engage the other arm of said load-reducing valve, thereby to lock said valve open when the closer is shut, and to unlock said load-reducing valve from its open-lock position and thereby permit the same to shut on the opening of said closer.

15. In a rising-poise weighing-machine, the combination of weighing mechanism embodying a load-receiver having closer mechanism operative to discharge a load on the ascent of said load-receiver; overload-supply means for said receiver; a load-reducing valve carried by said receiver and having a pair of arms; a valve operative to regulate the supply of material to said receiver, and also having an arm coacting with one of the load-reducing-valve arms, whereby, on the shutting of said supply-valve, the load-reducing valve is opened; and means connected with the closer mechanism and operative to engage the other arm of said load-reducing valve, thereby to lock said valve open when the closer mechanism is shut, and to unlock said load-reducing valve from its open-lock position, and thereby permit the same to shut on the opening of said closer mechanism.

16. The combination of weighing mechanism; overload-supply means therefor; a load-reducing instrumentality operative to effect the reduction of the overload, thereby to permit a true load to be obtained, and also operative to reduce such true load; and an instrumentality operative to direct the material constituting the overload discharge in one direction and to direct the material constituting the true-load discharge in another direction.

17. In a rising-poise weighing-machine, the combination of weighing mechanism embodying a load-receiver; overload-supply means therefor; and a load-reducing instrumentality operative to effect the reduction of the overload, thereby to permit a true load to be obtained, and then operative to reduce such true load, and thereby effect the operation of a part of said machine.

18. The combination of weighing mechanism; overload-supply means therefor; load-discharging means; and means operative to effect the reduction of said overload, thereby to bring the true load to a poise, and also operative to effect the reduction of the true load, thereby to secure the operation of the load-discharging means and permit the discharge of the main load.

19. The combination of weighing mechanism embodying a load-receiver; overload-supply means for said receiver; load-discharging means; and a load-reducing instrumentality controlled at one predetermined period by said load-discharging means and operative to effect the reduction of the overload, and also to effect the reduction of the true load, whereby the operation of said load-discharging means is effected.

20. The combination of weighing mechanism embodying a load-receiver; overload-supply means for said receiver; stream-controlling means operative to regulate the supply of material to said receiver; load-discharging means; and a load-reducing instrumentality, controlled at one predetermined period by said stream-controlling means and operative to effect the reduction of the overload, and also operative to effect the reduction of the true load, whereby the operation of said load-discharging means is effected.

21. The combination of weighing mechanism embodying a load-receiver; overload-supply means for said receiver; stream-controlling means operative to regulate the supply of material to said receiver; load-discharging means; and a load-reducing instrumentality controlled in its operation at one predetermined period by said stream-controlling means, and at another predetermined period by said load-discharging means, and operative to effect the reduction of the overload, thereby to bring the resultant true load to a poise, and also operative to effect the reduction of the true load, thereby to secure the operation of said load-discharging means and thereby effect the discharge of the main load.

22. The combination of a load-receiver having a closer; beam mechanism supporting said receiver; overload-supply means for said receiver; stream-controlling means for regulating the supply of material to said receiver; a load-reducing instrumentality operative to effect the reduction of the overload and the consequent poising of the true load, and then operative to effect the reduction of such true load, thereby to secure the overbalancing of the resultant load by the beam mechanism, whereby the closer is opened to effect the final discharge of said load.

23. The combination of weighing mechanism; overload-supply means therefor; load-discharging means; means operative to effect the reduction of said overload, thereby to bring the true load to a poise, and also operative to effect the reduction of the true load, thereby to secure the operation of the load-discharging means and the consequent discharge of the main load; and means operative to direct that portion of the material constituting the overload in one direction, and to direct that portion of the material constituting a part of the true load in another direction.

24. The combination of weighing mechanism embodying a load-receiver; overload-supply means for said receiver; stream-controlling means operative to regulate the supply of material to said receiver; load-discharging means; a load-reducing instrumentality controlled in its operation at one predetermined period by said stream-controlling means, and at another predetermined period by said load-discharging means, and operative to effect the reduction of the overload, thereby to bring the resultant true load to a poise, and also operative to effect the reduction of the true load, thereby to secure the operation of the load-discharging means, and thereby effect the discharge of the load; and stream-deflecting means operative in one position to direct that portion of the material forming the overload in one direction, and operative in another position to direct that portion of the material forming a part of the true load into position to rejoin and again form a part of the main load on the discharge thereof.

25. The combination of a load-receiver provided with a closer shiftable to discharge a load; a closer-opening device in position to engage said closer at one period; and weighted beam mechanism supporting said receiver, and operative, on the return of the weighted part thereof to its position of rest, to shift said receiver, and thereby its closer, into position to have said closer engage said opening device, thereby to open said closer and permit the discharge of the load.

26. The combination of weighing mechanism embodying a load-receiver having a movement to and from its load-receiving position, and provided with a load-discharging device non-operative by the weight of the material in the receiver; and means supported in position to engage and operate said discharging device on the return movement of said receiver to its load-receiving position, thereby to throw said discharging device into operation to discharge the load.

27. The combination of a load-receiver having descending and ascending movements, and embodying closer mechanism comprising a pair of closers, one operative by the other; beam mechanism supporting said receiver; means disposed in position to engage a part of one of said closers to actuate the same, and thereby its companion closer, on the ascent of said load-receiver and the return of the beam mechanism to its position of rest, and thereby permit the discharge of a load.

28. The combination of a load-receiver having descending and ascending movements, and provided with closer mechanism; beam mechanism supporting said receiver; and means disposed in position and operative to engage the closer mechanism on the return of the beam mechanism to its normal position and on the ascent of the load-receiver, thereby to actuate said closer mechanism independently of the weight of the material in said load-receiver, and permit the discharge of the load.

29. The combination with framework, of a load-receiver provided with a shiftable member operative to discharge a load; beam mechanism supporting said receiver; and an actuator carried by said framework and in position to engage said shiftable member and thereby open the same on the return of said beam mechanism to its position of rest.

30. Weighing mechanism embodying a load-receiver having descending and ascending movements, and provided with a pair of shiftable members each having an arm crossing the arm of its companion member, and operative to open and permit the discharge of the load on the ascent of said load-receiver.

31. Weighing mechanism embodying a load-receiver having descending and ascending movements, and provided with a pair of shiftable closers operative to discharge a load on the ascent of said load-receiver, and each of said closers having a pair of arms pivotally secured to said receiver, the arms of one closer crossing the arms of its companion closer.

32. Weighing mechanism embodying a load-receiver provided with a pair of shiftable closers operative to discharge a load, each having an arm crossing the arm of its companion closer, and one closer being operative to open its companion closer, thereby to permit the discharge of the load on the ascent of said load-receiver.

33. The combination with weighing mechanism embodying a load-receiver having descending and ascending movements, and provided with a pair of shiftable closers, each of said closers having a pair of arms pivotally secured to said load-receiver and crossing the arms of its companion closer, of means disposed in position to engage one of the arms of one of said closers, thereby to open both of said closers on the ascent of said load-receiver.

34. The combination of weighing mechanism embodying a load-receiver having descending and ascending movements and provided with a pair of closers pivotally secured to said load-receiver, and having means intermediate thereof whereby one closer opens its companion closer; an actuator in position to engage one of said closers; beam mechanism supporting said load-receiver, whereby, on the return of said beam mechanism to its normal position, and the ascent of said receiver, said actuator will engage said closer and thereby open both of said closers to permit the discharge of the load.

35. The combination with framework, of beam mechanism; a shiftable load-receiver supported by said beam mechanism and having a pair of closers, each of said closers having a pair of arms pivotally secured one at each side of said receiver, one of the closer-arms of one closer having a supplemental arm and also having a laterally extending and inclined projection, and one of the closer-arms of the other closer having a projecting member in engagement with said inclined projection, whereby, on the opening of one closer the other closer is also opened; and an actuator shiftably secured to the framework and in position to engage said supplemental closer-arm, thereby to open the closers on the shifting movement of the receiver.

36. The combination of weighing mechanism embodying a load-receiver having descending and ascending movements and provided with a shiftable member operative on the ascent of said receiver to discharge the load; and regulator mechanism operative in one direction to control the operation of said shiftable member at one predetermined time.

37. The combination with weighing mechanism embodying a load-receiver having descending and ascending movements, and provided with a shiftable member, of means adapted on the ascent of said load-receiver to open and maintain said shiftable member open, thereby to permit the discharge of a load; regulator mechanism; and means operative therewith and embodying a tripper adapted to unlock said shiftable member from its open-lock position, and thereby permit the same to close.

38. The combination with weighing mechanism embodying a load-receiver having descending and ascending movements, and provided with a pair of shiftable closers, of means adapted to open and lock said closers open on the ascent of said receiver, thereby to permit the discharge of the load; and regulator mechanism operative in one direction to unlock said closers from their open-lock position, and thereby permit the same to shut.

39. The combination with weighing mechanism embodying a load-receiver having descending and ascending movements and provided with a pair of shiftable closers, of means adapted to open and maintain said closers open on the ascent of said receiver, thereby to permit the discharge of the load; regulator mechanism; and means connected therewith and embodying a tripper operative to unlock said closers from their open-lock position and thereby permit the same to close.

40. The combination of weighing mechanism embodying a load-receiver having descending and ascending movements, and provided with a pair of shiftable closers; an actuator having a pair of projections, one adapted to engage one of said closers and thereby open and maintain said closers open on the ascent of said receiver, to permit the discharge of the load; regulator mechanism operative in one direction on the discharge of the load; and means connected therewith and embodying a tripper operative to engage the other actuator projection, thereby to unlock said closers from their open-lock position, and permit the same to shut.

41. The combination with material-supply means, of weighing mechanism embodying a movable load-receiver; and means, controlled by the direct engagement therewith of the supply material on its passage through or from the supply means, for locking the load-receiver against movement until a sufficient amount of material has been received by said receiver to overcome the action of said supply material in connection with said means.

42. The combination with a material-supply chute, of weighing mechanism embodying a shiftable load-receiver; locking means operative to retard the movement of said receiver, and comprising means disposed in position to be engaged by the material passing through or from the supply-chute; and means connected therewith and adapted to engage a part of the weighing mechanism, and thereby retard the movement of said receiver until the desired amount of material has been received thereby.

43. The combination of a material-supply chute; a shiftable load-receiver; beam mechanism supporting said receiver; locking means operative to retard the movement of said receiver and comprising a shiftable plate or blade, carried by said chute, and means connected with said plate or blade and operative to engage the beam mechanism, thereby to retard the movement of said load-receiver until the desired amount of material has been received thereby.

44. The combination of a load-receiver having descending and ascending movements; beam mechanism supporting the same; load-supply means for said receiver; locking means operative to retard the descent of said receiver until the desired amount of material has been received thereby, and comprising a shiftable member carried by the supply-chute and in engagement with the passing material; a locker disposed in position to engage the beam mechanism; and an adjustable connector intermediate said locker and said shiftable member.

45. The combination of a load-receiver; beam mechanism supporting said receiver; load-supply means for said receiver; and locking means operative to retard the movement of said load-receiver until the desired amount of material has been received thereby, and comprising an oscillatory member constituting one of the upright walls of the load-supply means, a locker adapted to engage said beam mechanism, and means connecting said oscillatory member and locker.

46. The combination with weighing mechanism, of a supply-chute therefor having a stream-passage for the supply of material to said weighing mechanism, said chute having a swinging blade or plate carried thereby and forming a part of one of the upright walls at the dischage end of said chute, and shiftable inwardly to reduce the supply-stream at one predetermined period.

47. The combination of a load-receiver provided with closer mechanism operative to discharge a load; overload-supply means for said receiver; stream-controlling means operative to regulate the supply of material to said receiver; a load-reducing instrumentality; means controlled by the closer mechanism and operative to lock said load-reducing instrumentality open; and means operated by the closer mechanism on the opening thereof to lock said stream-controlling means shut.

48. The combination of a movable load-receiver provided with closer mechanism operative to discharge a load; beam mechanism supporting said receiver; overload-supply means for said receiver; locking means operative to retard the movement of said receiver until an overload is assured; a load-reducing instrumentality; and means controlled by the closer mechanism and operative to lock said load-reducing instrumentality open and also to unlock the same on the opening of the closer mechanism, thereby to permit said load-reducing instrumentality to shut.

49. The combination of a load-receiver provided with closer mechanism operative to discharge a load; beam mechanism supporting said receiver; overload-supply means for said receiver; stream-controlling means adapted to regulate the supply material to said receiver; locking means operative to retard the movement of said receiver until an overload is assured; a load-reducing instrumentality; means controlled by the closer mechanism and operative to lock said load-reducing instrumentality open, and also to unlock the same on the opening of the closer mechanism, thereby to permit said load-reducing instrumentality to shut; and means operative with the closer mechanism on the opening thereof to lock said stream-controlling means shut.

50. The combination with weighing mechanism embodying a load-receiver adapted in one position to receive an overload, of means operative in another position of said receiver to effect the reduction of the material in said receiver; and means operative to commence the final discharge of the material remaining in the receiver on the return of said receiver to its load-receiving position after its ascent above its poising position.

51. The combination of weighing mechanism embodying a load-receiver adapted in one position to receive an overload, thereby to carry said receiver into position to have such overload reduced; means for reducing such overload, thereby to obtain a true load and carry the receiver to a poise position to permit the continuous operation of said reducing means to reduce such true load, thereby to carry the receiver to a position above its poise position.

52. In a rising-poise weighing-machine, the combination of weighing mechanism; overload-supply means therefor; a load-reducing instrumentality operative to effect the reduction of the overload, and then reduce the true load; and a stream-deflecting instrumentality controlled by the weighing mechanism and operative to direct the overload discharge in one direction, and the true-load discharge in another direction.

53. In a rising-poise weighing-machine, the combination of weighing mechanism; overload-supply means therefor; a load-reducing instrumentality operative to effect the reduction of the overload, and then reduce the true load; and a shiftable counterbalanced stream-deflecting instrumentality operative in one position to direct the overload discharge in one direction and then shiftable into another position to direct the true-load discharge in another direction.

54. In a weighing-machine, the combination of weighing mechanism; load-supply means therefor; load-reducing means; and a shiftable stream-deflecting instrumentality provided with a weight and shiftable into one position by the weighing mechanism and into another position by said weight, thereby to direct one part of the material in one direction and another part thereof in another direction.

55. In a weighing-machine, the combination of weighing mechanism; overload-supply means therefor; load-reducing means operative to reduce both the overload and the true load; and an oscillatory stream-deflecting instrumentality provided with a weight and shiftable into one position by the weighing mechanism, on the descent thereof, to direct the overload in one direction, and then shiftable by its weight into another position, on the ascent of said weighing mechanism, to direct the true load in another direction.

56. The combination with rising-poise weighing mechanism embodying a load-receiver adapted in one position to receive an overload, of means operative to effect the reduction of said overload, and thereby permit the ascent of said receiver to a poise position, and also operative to effect the reduction of said resultant true load on the return of said receiver to its poise position; and means operative to discharge the load on the return of said receiver to its load-receiving position.

57. The combination of weighing mechanism embodying a load-receiver having a pair of spouts disposed one within the other; and a load-reducing valve carried by said receiver and in one position thereof adapted to extend under a part of one of said spouts and over a part of the other spout.

58. In a weighing-machine, the combination of a load-receiver; beam mechanism supporting said receiver and embodying counterbalancing means; and stream-deflecting means disposed in position and adapted to constitute a part of the receiver-counterbalancing means.

59. In a rising-poise weighing-machine, the combination of weighing mechanism embodying a load-receiver; and stream-deflecting means disposed in position and adapted to co-act with said weighing mechanism, thereby to assist the ascent of said receiver and the poising thereof.

60. In a rising-poise weighing-machine, the combination of weighing mechanism embodying a load-receiver; load-supply means for said receiver; a load-reducing instrumentality; and a stream-deflecting instrumentality operative to assist the poising of said load-receiver.

61. In a rising-poise weighing-machine, the combination of weighing mechanism embodying a load-receiver; overload-supply means for said receiver; a load-reducing instrumentality operative to reduce the overload, thereby to secure a true load, and also operative to reduce a part of such true load; and a stream-deflecting instrumentality adapted to assist the poising of the load-receiver, and operative to direct the overload in one direction, and also operative to direct a part of the true load in another direction.

62. In a rising-poise weighing-machine, the combination of weighing mechanism embodying a load-receiver provided with a shiftable member operative to discharge a load; overload-supply means for said receiver; a load-reducing instrumentality operative to reduce the overload, thereby to secure a true load, and also operative to reduce a part of such true load, whereby the opening of the shiftable member is effected; and a stream-deflecting instrumentality controlled in its operation by said weighing mechanism, and adapted to assist the poising of the load-receiver, and operative to direct the overload in one direction, and also operative to direct a part of the true load in another direction.

63. A rising-poise weighing-machine, comprehending weighing mechanism comprising a load-receiver and beam mechanism supporting said receiver; overload-supply means; stream-controlling means for regulating such supply; material-discharge means controlled by the beam mechanism to permit the discharge of the load at the proper predetermined period; load-reducing means controlled at one predetermined period by the stream-controlling means and at another predetermined period by the material-discharge means, and operative to reduce the overload and also a part of the resultant true load; stream-deflecting means controlled by the weighing mechanism through the medium of the load-receiver; locking means adapted to prevent the descent of the load-receiver until an overload is secured; locking means operative to maintain the stream-controlling means shut on the opening of the material-discharge means, and to prevent the opening of said material-discharge means while said stream-controlling means is open; and regulator means adapted to control the operation of a part of said machine.

64. In a rising-poise weighing-machine, the combination with a main and a supplemental discharge-hopper communicating with each other, of weighing mechanism operative to discharge material into said main hopper at the proper predetermined period; overload-supply means for said weighing mechanism; load-reducing means for said weighing mechanism and operative to reduce the overload and then reduce the true load; and a stream-deflecting instrumentality operative to direct the overload discharge into the supplemental hopper, and the true-load discharge into the main hopper to rejoin and again form a part of the material discharged thereinto by the weighing mechanism.

65. The combination of weighing mechanism embodying a load-receiver; load-supply means therefor; stream-controlling means for regulating the supply of material to said receiver; a load-reducing instrumentality operative to effect the reduction of a load before the final disposition thereof, and thrown into operation at one predetermined period by said stream-controlling means; and means, non-connected with the stream-controlling means, for maintaining said load-reducing instrumentality in operation.

66. The combination of weighing mechanism embodying a load-receiver; load-supply means therefor; stream-controlling means for regulating the supply of material to said receiver; a load-reducing valve operative to effect the reduction of a load before the final discharge thereof, and opened at one predetermined period by said stream-controlling means; and means, non-connected with the stream-controlling means, for maintaining said valve open during the load-reducing period and operative to permit the valve to close after the reduction of the load.

67. In a rising-poise weighing-machine, the combination of weighing mechanism embodying a load-receiver; load-supply means therefor; a load-reducing device operative to effect the reduction of a load; and a load-discharging device adapted, before movement and on the operation of the load-reducing device, to maintain said load-reducing device in operation to reduce a load.

68. In a rising-poise weighing-machine, the combination of weighing mechanism embodying a load-receiver; overload-supply means therefor; a load-reducing device operative to effect the reduction of a load; and a load-discharging device adapted, before movement and on the operation of the load-reducing device, to lock said load-reducing device in operation to reduce a load, and operative on its movement to discharge the load, to unlock said load-reducing device and permit the cutting off of such load reduction.

69. In a rising-poise weighing-machine, the combination of weighing mechanism embodying a load-receiver; load-supply means therefor embodying stream-controlling means; a load-reducing device operative to effect the reduction of a load, and controlled in its operation at one period by the stream-controlling means; and a load-discharging device adapted, before movement, to maintain the load-reducing device in operation to permit the reduction of a load, and operative on its discharging movement to unlock the said load-reducing device and permit the cutting off of such load reduction.

70. The combination of weighing mechanism embodying a load-receiver; load-supply means for said receiver; a load-reducing instrumentality operative to effect the reduction of a load before the final disposition thereof; a stream-deflecting instrumentality operative to divide and direct one part of the load-reducing stream in one direction, and another part thereof in another direction; and means operative to maintain said load-reducing instrumentality in operation during a predetermined period.

71. The combination of weighing mechanism embodying a load-receiver; overload-supply means for said receiver; a load-reducing instrumentality operative to effect the reduction of a load before the final disposition thereof; a stream-deflecting instrumentality operative to divide and direct one part of the load-reducing stream in one direction, and another part thereof in another direction; and load-discharge means adapted in one position to lock said load-reducing instrumentality in operation, and operative, on its movement to discharge the load, to unlock said load-reducing instrumentality and permit the cutting off of the load reduction.

72. The combination of weighing mechanism embodying a load-receiver having a movement to and from its load-receiving position, and provided with non-locked closer mechanism supported in position to be non-operative by the weight of the material in the receiver; and means in position to engage and open said closer mechanism on the return movement of said receiver to its load-receiving position.

FRANCIS H. RICHARDS.

Witnesses:
C. A. WEED,
EDWARD A. MEAD.